(12) United States Patent
Yu et al.

(10) Patent No.: US 8,648,981 B2
(45) Date of Patent: Feb. 11, 2014

(54) DISPLAY DEVICE AND BACKLIGHT MODULE THEREOF

(75) Inventors: Dong-Xian Yu, Tainan (TW); Ying-Che Huang, Changhua County (TW)

(73) Assignee: Hannstar Display Corp., New Taipei (TW)

( * ) Notice: Subject to any disclaimer, the term of this patent is extended or adjusted under 35 U.S.C. 154(b) by 66 days.

(21) Appl. No.: 13/176,908

(22) Filed: Jul. 6, 2011

(65) Prior Publication Data

US 2012/0182494 A1 Jul. 19, 2012

(30) Foreign Application Priority Data

Jan. 18, 2011 (TW) .............................. 100101865 A

(51) Int. Cl.
*G02F 1/13357* (2006.01)

(52) U.S. Cl.
USPC .............................................. 349/61; 349/65

(58) Field of Classification Search
None
See application file for complete search history.

(56) References Cited

U.S. PATENT DOCUMENTS

| 7,463,325 | B2* | 12/2008 | Oohira | 349/149 |
| 2003/0164903 | A1* | 9/2003 | Saito et al. | 349/58 |
| 2005/0179850 | A1* | 8/2005 | Du | 349/150 |
| 2006/0285353 | A1* | 12/2006 | Kim | 362/561 |
| 2008/0278653 | A1* | 11/2008 | Chung et al. | 349/58 |
| 2009/0262277 | A1* | 10/2009 | Kim | 349/58 |
| 2009/0310336 | A1* | 12/2009 | Yoon et al. | 362/97.1 |
| 2011/0102726 | A1* | 5/2011 | Nobeoka et al. | 349/150 |

FOREIGN PATENT DOCUMENTS

| JP | 2003-92020 A | * | 3/2003 |
| JP | 2004-177876 A | * | 6/2004 |

* cited by examiner

*Primary Examiner* — Mike Stahl
(74) *Attorney, Agent, or Firm* — Volpe and Koenig, P.C.

(57) ABSTRACT

The display apparatus includes a backlight module, which includes a light source, a light-emitting surface, a light-emitting counter surface and a flexible circuit. The light-emitting counter surface is disposed opposite to the light-emitting surface. The flexible circuit is electrically connected with the light source, and has a portion covering the light-emitting counter surface.

9 Claims, 3 Drawing Sheets

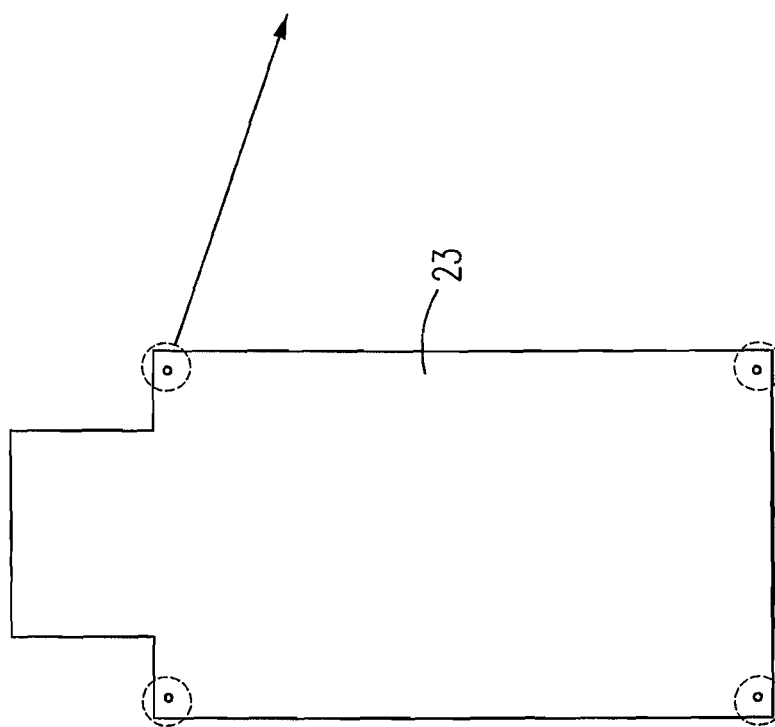

DISPLAY DEVICE AND BACKLIGHT MODULE THEREOF

CROSS REFERENCE TO RELATED APPLICATIONS

The application claims the benefit of Taiwan Patent Application No. 100101865, filed on Jan. 18, 2011, at the Taiwan Intellectual Property Office, the disclosures of which are incorporated herein in their entirety by reference.

FIELD OF THE INVENTION

The present invention relates to a backlight module, especially to a backlight module used for a liquid crystal display apparatus.

BACKGROUND OF THE INVENTION

As the technologies are advancing and product prices are continuously going down, flat panel displays, specially liquid crystal display devices, have become more and more common. The applications of the liquid crystal display devices include computer monitors, notebook computers, LCD commercial billboards, LCD TVs, LCD digital photo frames, LCD video players, mobile phones, personal digital assistants (PDA), portable navigation devices, etc. These applications exist almost everywhere, and have become an indispensable part of human daily life. However, technology often comes from humanity, and the majority of customers still expect the liquid crystal display devices with lower prices, better performances, lighter weight and slimmer dimensions. Therefore, the scientists and engineers have continuously been doing the research, development and innovation, and hope to develop the products with superior performances and even or lower manufacturing costs to meet the daily requirements of the customers.

Currently the portable liquid crystal display devices on the market, such as notebook computers, mobile phones, PDAs, portable LCD audio and video players (MP3, MPEG4, etc.), portable navigation devices, particularly the mobile phones daily used by the general public, still have the issues of not enough light weight and not enough slim thickness, from the views of the long-time and frequent usages, so there is still considerable room to be improved for the technology experts to continuously work on.

Please refer to FIG. 1, which is the schematic diagram showing a cross section view of the structure of the conventional backlight module. In FIG. 1, the backlight module 100 includes the LED light source 11, back cover 10, the plastic frame 15, etc. The overall thickness of the backlight module 100 is still not thin enough, and the weight of the backlight module 100 is still not light enough.

For overcoming the mentioned drawbacks existing in the conventional techniques, a novel display apparatus and the backlight module thereof with the superior display performances and the capability to effectively solve the above-mentioned drawbacks are developed by the inventors after the research and development, numerous experiments and improvements so as to benefit the customers.

SUMMARY OF THE INVENTION

The present invention provides a display apparatus and the backlight module thereof with the light weight and slim dimensions.

In accordance with one aspect of the present invention, a display apparatus is provided. The display apparatus includes a backlight module including a light source, a light-emitting surface, a light-emitting counter surface disposed opposite to the light-emitting surface, and a flexible circuit electrically connected with the light source and having a portion covering the light-emitting counter surface.

In accordance with another aspect of the present invention, a backlight module is provided. The backlight module includes a light-emitting surface, a light-emitting counter surface disposed opposite to the light-emitting surface, and a flexible circuit having a portion covering the light-emitting counter surface.

In accordance with a further aspect of the present invention, a backlight module is provided. The backlight module includes a light-emitting surface, a light-emitting counter surface disposed opposite to the light-emitting surface, and a flexible piece covering the light-emitting counter surface.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIG. 3A is the schematic diagram showing a flexible circuit with positioning holes in one embodiment of the present invention; and FIG. 3B is the schematic diagram showing an enlarged view of the flexible circuit with positioning holes and positioning lumps in FIG. 3A.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 2A:
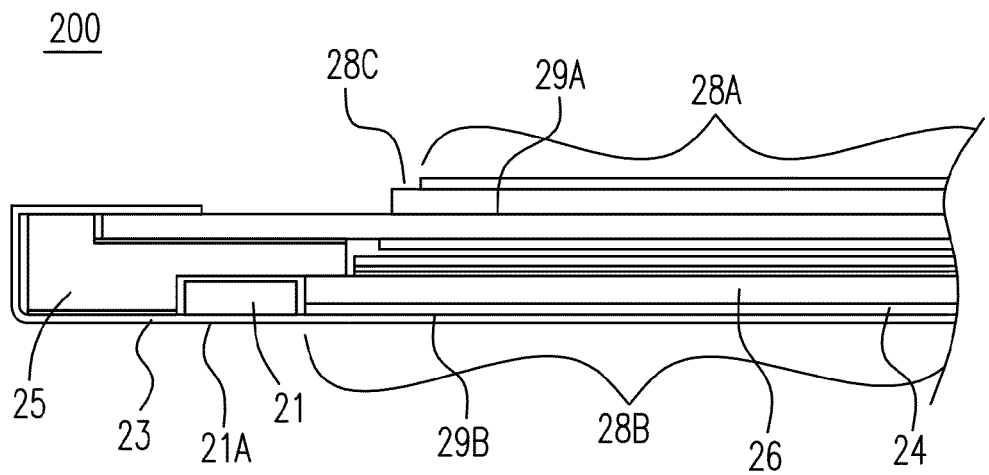
FIG. 2A is the schematic diagram showing a cross section view of the structure of a backlight module in one embodiment of the present invention.

Please refer to FIG. 2A, which is the schematic diagram showing a cross section view of the structure of a backlight module in one embodiment of the present invention. Since the dimension of the thickness of the backlight module is relatively much smaller than the dimensions of the length and width of the backlight module, accordingly only the cross sectional view around the edge of the backlight module is shown for facilitating the illustration in order to avoid the difficulty of scaling due to the tremendous differences among the thickness, width and length. As shown in FIG. 2A, the backlight module 200 includes a light-emitting diode (LED) light source 21, a flexible piece (e.g. flexible circuit) 23, a fixing frame (e.g. plastic frame or rubber frame) 25, a light-reflection film 24, a light guide plate 26 and so on. The backlight module 200 has a light-emitting surface 29A, i.e. the upper surface of backlight module 200 in FIG. 2A. The surface opposite to the light-emitting surface 29A is the light-emitting counter surface 29B, i.e. the bottom surface of the backlight module 200 in FIG. 2A.

The light-emitting surface 29A has a light-emitting area 28A, which usually occupies the whole area of the light-emitting surface 29A besides the edge area 28C. The light-emitting counter surface 29B has a light-emitting counter area 28B, which size is nearly equal to or a little larger than that of the light-emitting area 28A, and which location is a place right below the light-emitting area 28A. The LED light source 21 emits light, which is guided and reflected through the light guide plate 26, and evenly emitted upward from the light-emitting area 28A. The light-reflection film 24 can reflect the downward light back into the light guide plate 26. The above LED light source 21 can be designed as a light source of white light LEDs or a light source of red (R), green (G) and blue (B) (three primary colors) light LEDs array to be lightened sequentially. On the other hand, the LED light source 21 can be replaced with other light sources, such as cold cathode fluorescent lamp (CCFL), organic light-emitting diode (OLED) or other types of light sources.

Figure 1:
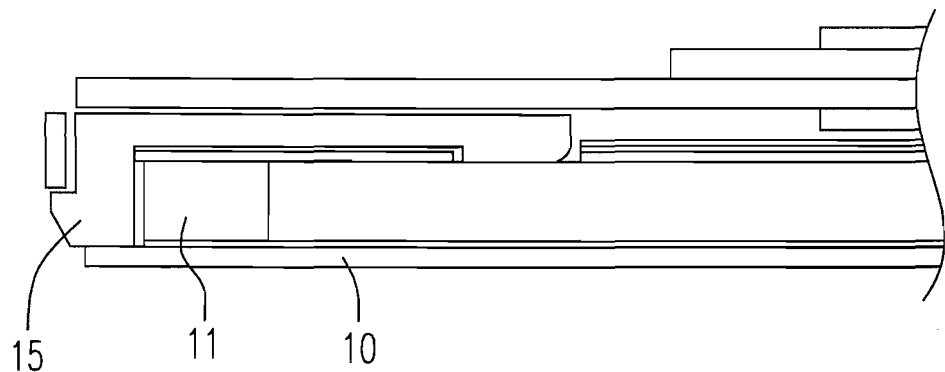
FIG. 1 is the schematic diagram showing a cross section view of the structure of the conventional backlight module.

Please refer to FIG. 2A. The flexible circuit 23 is folded downward at the edge of the top light-emitting surface 29A, passes through the outer surface of the side wall of the backlight module 200, is folded rightward at the edge of the light-emitting counter surface (i.e. the back surface) of the backlight module 200, and horizontally extends rightward so that at least one portion of the flexible circuit 23 covers the light-emitting counter area 28B of the light-emitting counter surface 29B or covers the entire light-emitting counter surface 29B. Compared with the conventional technique in FIG. 1, the back cover 10 in FIG. 1 is not used in the present embodiment, but the flexible circuit 23 is adopted to cover the back of the backlight module in the present embodiment. The flexible circuit 23 can be the flexible printed circuit (FPC) currently available on the market. Since the FPC is much thinner and lighter than the back cover 10, the slim and light-weight properties can be significantly enhanced. On the other hand, since the back cover is not required in this embodiment, the costs of the back cover and the mold therefor can be saved. Especially compared with the conventional technique under the condition that there are a variety of dimensional designs for the products and each dimensional design necessitates its corresponding mold, this embodiment can tremendously save the costs of the molds.

In this embodiment, the LED light source 21 can be directly soldered to the flexible circuit 23. Since the FPC is required to electrically connect the module of the liquid crystal cells to the LED backlight, this embodiment does not require additional materials or parts, and instead the flexible circuit 23 of a large area is adopted to cover the back of the backlight module 200 in this embodiment and to replace the conventional back cover. Since the effect of the slim and light-weight properties generated in the present embodiment is quite significant with the thickness reduction higher than 0.2 mm, the present embodiment can bring great benefits for the users, who carry and use the display devices, e.g. mobile phones, for long time.

Figure 2B:
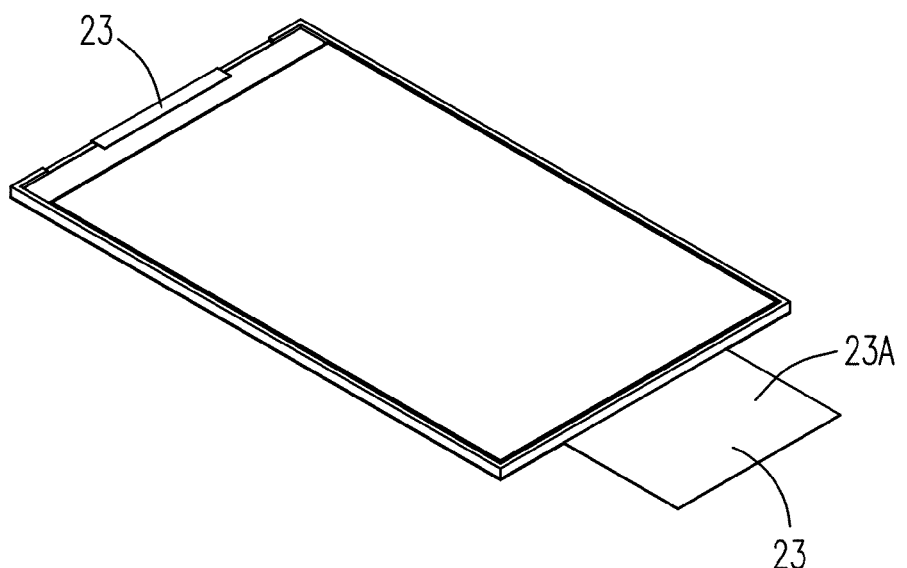
FIG. 2B is the schematic diagram showing a three-dimensional top view of the structure of a backlight module in one embodiment of the present invention.

For the clear illustration of the present embodiment, please refer to FIG. 2B, which is the schematic diagram showing a three-dimensional top view of the structure of a backlight module in the present embodiment. In FIG. 2B, the flexible circuit 23 is folded downward at the left edge of the upper surface of the backlight module 200, and then folded again so that at least one portion of the flexible circuit 23 covers the back of the backlight module 200, i.e. the bottom of the backlight module 200 shown in FIGS. 2A and 2B. The protruding area 23A of the flexible circuit 23 can be used as the signal output terminal.

Regarding the fixing method of the flexible circuit 23, please refer to FIGS. 3A and 3B. The flexible circuit 23 can be designed to have plural positioning holes 27A, which can be circular or have other shapes). In the present embodiment, the flexible circuit 23 is designed to have four circular position holes 27A located in around four corners. The fixing frame 25 of the backlight module 200 can be designed to contain plural positioning lumps 27B locatively corresponding to the plural positioning holes 27A. The size of positioning lumps 27B can be slightly smaller than the size of the positioning holes 27A, so the positioning lumps 27B can be fitted into the positioning holes 27A so as to position the flexible circuit 23 onto the fixing frame 25. The sizes, shapes, quantities and locations of the above-mentioned positioning holes 27A and positioning lumps 27B can be appropriately changed, as long as both are correspondingly changed to be fitted with each other. An adhesive can be used to fix the flexible circuit 23 onto the fixing frame 25 to reduce the total weight. Of course, other fixing methods rather than using the adhesive can be selected instead.

In this embodiment, the light-reflection film 24 can be a reflection plate fixed on the flexible circuit 23 by using the adhesive or other methods. In addition, the light-reflection film 24 can be directly formed on the flexible circuit 23 by using the vacuum sputtering, vacuum evaporation, etc. so as to further reduce the weight and thickness of the backlight module 200.

The examples of the present invention are described in the followings.

In a first example of the present invention, a display apparatus is provided. The display apparatus includes a backlight module, which includes a light source, a light-emitting surface, a light-emitting counter surface disposed opposite to the light-emitting surface, and a flexible circuit electrically connected with the light source and having a portion covering the light-emitting counter surface.

In a second example of the present invention, the light-emitting surface in a display apparatus of the first example includes a light-emitting area, the light-emitting counter surface in a display apparatus of the first example includes a light-emitting counter area locatively corresponding to the light-emitting area, and the portion of the flexible circuit in a display apparatus of the first example completely covers the light-emitting counter area.

In a third example of the present invention, the backlight module in a display apparatus of any one of the preceding examples has at least an internal edge 21A, and the light source in a display apparatus of any one of the preceding examples is disposed on the internal edge 21A.

In a fourth example of the present invention, the light source in a display apparatus of any one of the preceding examples includes one selected from a group consisting of a light emitting diode, an organic light emitting diode and a cold cathode fluorescent lamp.

In a fifth example of the present invention, a display apparatus of any one of the preceding examples includes a liquid crystal display apparatus.

In a sixth example of the present invention, the backlight module in a display apparatus of any one of the preceding examples further includes a light guide plate and a fixing frame, and the flexible circuit in a display apparatus of any one of the preceding examples has an edge fixed between the light guide plate and the fixing frame.

In a seventh example of the present invention, the fixing frame in a display apparatus of any one of the preceding examples is one of a plastic frame and a rubber frame.

In a eighth example of the present invention, the flexible circuit in a display apparatus of any one of the preceding examples has a plurality of positioning holes, and the fixing frame in a display apparatus of any one of the preceding examples has a plurality of positioning lumps locatively corresponding to the positioning holes so that the flexible circuit is positioned on the fixing frame.

In a ninth example of the present invention, the light source in a display apparatus of any one of the preceding examples emits a light, and the flexible circuit in a display apparatus of any one of the preceding examples includes a light-reflection film attached thereon to reflect the light from the light source.

In a tenth example of the present invention, the flexible circuit in a display apparatus of any one of the preceding examples is a flexible printed circuit.

In an eleventh example of the present invention, a backlight module is provided. The backlight module includes a light-emitting surface, a light-emitting counter surface disposed opposite to the light-emitting surface, and a flexible circuit having a portion covering the light-emitting counter surface.

In a twelfth example of the present invention, a backlight module of any one of the preceding examples further includes a light source electrically connected with the flexible circuit, wherein the light-emitting surface includes a light-emitting area, the light-emitting counter surface includes a light-emitting counter area, and the portion of the flexible circuit completely covers the light-emitting counter area.

In a thirteenth example of the present invention, a backlight module of any one of the preceding examples has at least an internal edge 21A, and the light source in a backlight module of any one of the preceding examples is disposed on the internal edge 21A.

In a fourteenth example of the present invention, the light source in the backlight module of any one of the preceding examples includes one selected from a group consisting of a light emitting diode, an organic light emitting diode and a cold cathode fluorescent lamp, and the backlight module of any one of the preceding examples is used in a display apparatus including a liquid crystal display apparatus.

In a fifteenth example of the present invention, a backlight module of any one of the preceding examples further includes a light guide plate and a fixing frame, wherein the flexible circuit has an edge fixed between the light guide plate and the fixing frame.

In a sixteenth example of the present invention, the fixing frame in the backlight module of any one of the preceding examples is one of a plastic frame and a rubber frame, and the flexible circuit in the backlight module of any one of the preceding examples is a flexible printed circuit.

In a seventeenth example of the present invention, the flexible circuit in the backlight module of any one of the preceding examples has a plurality of positioning holes, and the fixing frame in the backlight module of any one of the preceding examples has a plurality of positioning lumps locatively corresponding to the positioning holes so that the flexible circuit is positioned on the fixing frame.

In a eighteenth example of the present invention, a backlight module of any one of the preceding examples further includes a light source electrically connected with the flexible circuit, wherein the light source emits a light, and the flexible circuit includes a light-reflection film attached thereon to reflect the light from the light source.

In a nineteenth example of the present invention, a backlight module is provided. The backlight module includes a light-emitting surface, a light-emitting counter surface disposed opposite to the light-emitting surface, and a flexible piece covering the light-emitting counter surface.

In a twentieth example of the present invention, a backlight module of any one of the preceding examples further includes a light source electrically connected with the flexible piece including a flexible printed circuit, wherein the light-emitting surface includes a light-emitting area, the light-emitting counter surface includes a light-emitting counter area, and the flexible piece completely covers the light-emitting counter area.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A display apparatus, comprising: a backlight module including: a light source; a light-emitting surface; a light-emitting counter surface disposed opposite to the light-emitting surface; and a flexible circuit directly connected to and electrically connected with the light source, and having a portion covering the light-emitting counter surface, wherein the light-emitting surface includes a light-emitting area and an edge area, each of which has a size, the size of the light-emitting area is larger than that of the edge area, the light-emitting counter surface includes a light-emitting counter area located below the light-emitting area and having a size nearly equal to that of the light-emitting area, and the portion of the flexible circuit completely covers the light-emitting counter area.

2. A display apparatus of claim 1, wherein the backlight module has at least an internal edge, and the light source is disposed on the internal edge.

3. A display apparatus of claim 1, wherein the light source comprises one selected from a group consisting of a light emitting diode, an organic light emitting diode and a cold cathode fluorescent lamp.

4. A display apparatus of claim 1, comprising a liquid crystal display apparatus.

5. A display apparatus of claim 1, wherein the backlight module further includes a light guide plate and a fixing frame.

6. A display apparatus of claim 5, wherein the fixing frame is one of a plastic frame and a rubber frame.

7. A display apparatus of claim 5, wherein the flexible circuit has a plurality of positioning holes, and the fixing frame has a plurality of positioning lumps locatively corresponding to the positioning holes so that the flexible circuit is positioned on the fixing frame.

8. A display apparatus of claim 1, wherein the light source emits a light, and the flexible circuit includes a light-reflection film attached thereon to reflect the light from the light source.

9. A display apparatus of claim 1, wherein the flexible circuit is a flexible printed circuit.

* * * * *